US005349985A

United States Patent [19]

Fischer

[11] Patent Number: 5,349,985

[45] Date of Patent: Sep. 27, 1994

[54] PLUMBING FIXTURE

[75] Inventor: Gerhard Fischer, Campione, Italy

[73] Assignee: Cosmos Entwicklungs-und Forschungsanstalt, Vaduz, Liechtenstein

[21] Appl. No.: 30,326

[22] Filed: Mar. 12, 1993

[30] Foreign Application Priority Data

Jul. 20, 1991 [DE] Fed. Rep. of Germany ....... 4124154

[51] Int. Cl.[5] ............................................ F16K 11/24

[52] U.S. Cl. ............................... 137/607; 251/129.04; 290/52

[58] Field of Search ................ 137/607, 487.5, 101.21; 290/52; 310/156; 251/129.04

[56] References Cited

U.S. PATENT DOCUMENTS

| | | | |
|---|---|---|---|
| 2,270,141 | 1/1942 | Potter | 290/52 |
| 2,436,683 | 2/1948 | Wood | 290/52 |
| 2,683,224 | 7/1954 | Cole | 290/52 |
| 4,464,580 | 8/1984 | Miller et al. | 290/52 |
| 4,951,915 | 8/1990 | Piao | 251/129.04 X |

FOREIGN PATENT DOCUMENTS

| | | |
|---|---|---|
| 3905759 | 3/1990 | Fed. Rep. of Germany . |
| 8501337 | 3/1985 | World Int. Prop. O. . |
| 8705352 | 9/1987 | World Int. Prop. O. . |

*Primary Examiner*—Stephen M. Hepperle
*Attorney, Agent, or Firm*—Robert W. Becker & Associates

[57] ABSTRACT

The plumbing fixture, which can be actuated without physical contact, has a water line that is connected to a source of water and has a water outlet. A shut-off valve is disposed in the water line downstream of a mixer valve. A control unit controls the shut-off valve as a function of control signals from a proximity-sensitive sensor. A turbine is disposed in the water line for supplying electrical energy to the control unit. Permanent magnets are distributed equidistantly about an outer periphery of a wheel of the turbine. At the level of the permanent magnets, at least two magnet coils are provided in a tubular section of the water line. The coils cooperate with the permanent magnets to form a generator.

15 Claims, 4 Drawing Sheets

PLUMBING FIXTURE

BACKGROUND OF THE INVENTION

The present invention relates to a sanitary or plumbing fixture that can be activated without physical contact and that has a water outlet connected to a water line, a mixer valve disposed in the water line, and a non-return or shut-off valve that is disposed downstream of the mixer valve, can be controlled by a proximity-sensitive sensor, and can be actuated by a control unit as a function of control signals of the sensor, whereby to supply the control unit with electrical energy, a turbine that is disposed in the water line and an associated generator, which is preferably connected to an energy accumulator, are provided.

A plumbing fixture of this general type is known from DE-C1 - 39 05 759. In the region of the turbine, the water line is embodied as an annular channel into which the vanes of the turbine project. Disposed within the annular channel is a separate housing for the generator, the shaft that carries the blades or vanes of the turbine, as well as the speed-changing gear box.

Although this plumbing fixture is capable of operating without being connected to a main power supply, since, however, the generator is built into the water line, the electrical energy must be withdrawn therefrom using sliding contacts and must be guided out of the water line. Due to the small amount of energy that can be converted from the flowing water, substantial losses are incurred and it is also often difficult to effectively seal the generator, which means that it is not possible to ensure a problem-free and maintenance-free operation over an extended period of time.

It is therefore an object of the present invention to design a plumbing fixture of the aforementioned general type that can be actuated without physical contact and where no problems and virtually no losses are encountered when transferring the electrical energy produced by the generator directly to the control unit or to the energy accumulator, with no special seals for the generator or other components having to be provided. Above all, however, the generator should be capable of operating at high speed without the need for a speed-changing gear box and the losses associated therewith, thus ensuring good utilization of the hydrodynamic energy of the water and hence a high level of efficiency. The manufacturing expense incurred by doing so should be minimal, and the components that are to be disposed in the water line should all have straightforward designs and small dimensions to ensure that they can operate over a long period of time without problems and without maintenance, and that the plumbing fixture can be installed virtually anywhere and can also be retrofitted.

SUMMARY OF THE INVENTION

Pursuant to the present invention, this object is realized by a sanitary or plumbing fixture of the aforementioned general type by mounting the turbine wheel directly in the water supply channel of the water line on a shaft that extends in the direction of flow and about which the turbine wheel can be rotatably driven; permanent magnets are distributed equidistantly about an outer periphery of the turbine wheel; in or on the wall of the water line, at the level of the permanent magnets, two or more magnet coils are provided that are oriented in the axial direction of the water line and that cooperate with the permanent magnets of the turbine wheel to form the generator.

In this connection, it is appropriate to provide the water line with a first and a second partition through which water can flow, with the turbine wheel being disposed between these partitions and being rotatably supported in the partitions by means of centering points and centering bores.

To achieve a high turbine speed in a simple manner, the outer region of the first partition, which is disposed upstream of the wheel of the turbine, should be provided with one or more nozzle or jet apertures, which are preferably disposed at an angle relative to the direction of flow, and the turbine wheel should be provided, at the diameter of the jet apertures of the first partition, with vanes that preferably extend perpendicular to an axis of the jet apertures, with the number of vanes of the turbine wheel corresponding to the number of jet apertures that are disposed in the first partition.

The turbine wheel can also be provided with an axially projecting extension that extends into a recess of the water line, with the permanent magnets of the generator, which is preferably a synchronous generator, being disposed in this extension.

Pursuant to another embodiment, the turbine wheel, radially inwardly of the permanent magnets, can be provided with vanes that are adapted to be driven by the flowing medium.

To reduce the resistance to flow, the outer sides of the two partitions and/or that side of the turbine wheel that faces away from the first partition can be provided with conical projections that are shaped in a way that enhances flow.

The two partitions and the turbine wheel that is disposed therebetween can expediently be disposed in a conical widened portion of the water line.

For ecological reasons, and to save space, the energy accumulator can be a capacitor.

If a plumbing fixture is embodied as taught by the present invention, there results not only a compact assembly that can be installed and also retrofitted virtually anywhere, and that is capable of operating, without disruption, without having to be connected to a power source, but also no problems and no significant power losses are encountered when the electrical energy is transferred from the generator to the control unit or the energy accumulator. Sliding contacts are not required to accomplish this, nor is it necessary to dispose electrical cables in the water line; rather, the coils disposed in the water line are permanently mounted and are easy to connect to the control unit or the energy accumulator. Furthermore, since water is received from jet apertures and therefore flows very fast, the vanes of the turbine wheel can rotate at high speeds. Thus, an adequate amount of energy is always available for operating the plumbing fixture. Despite the simple and inexpensive construction, a high degree of utilization of the hydrodynamic energy of the water is achieved and a problem-free and maintenance-free operation is ensured over a long period of time without having to worry about the need for replacing and disposing of batteries.

BRIEF DESCRIPTION OF THE DRAWINGS

The drawings show one exemplary embodiment of the inventive sanitary or plumbing fixture that operates without physical contact, and that will be described in detail subsequently. These drawings show.

DESCRIPTION OF PREFERRED EMBODIMENTS

Figure 1:
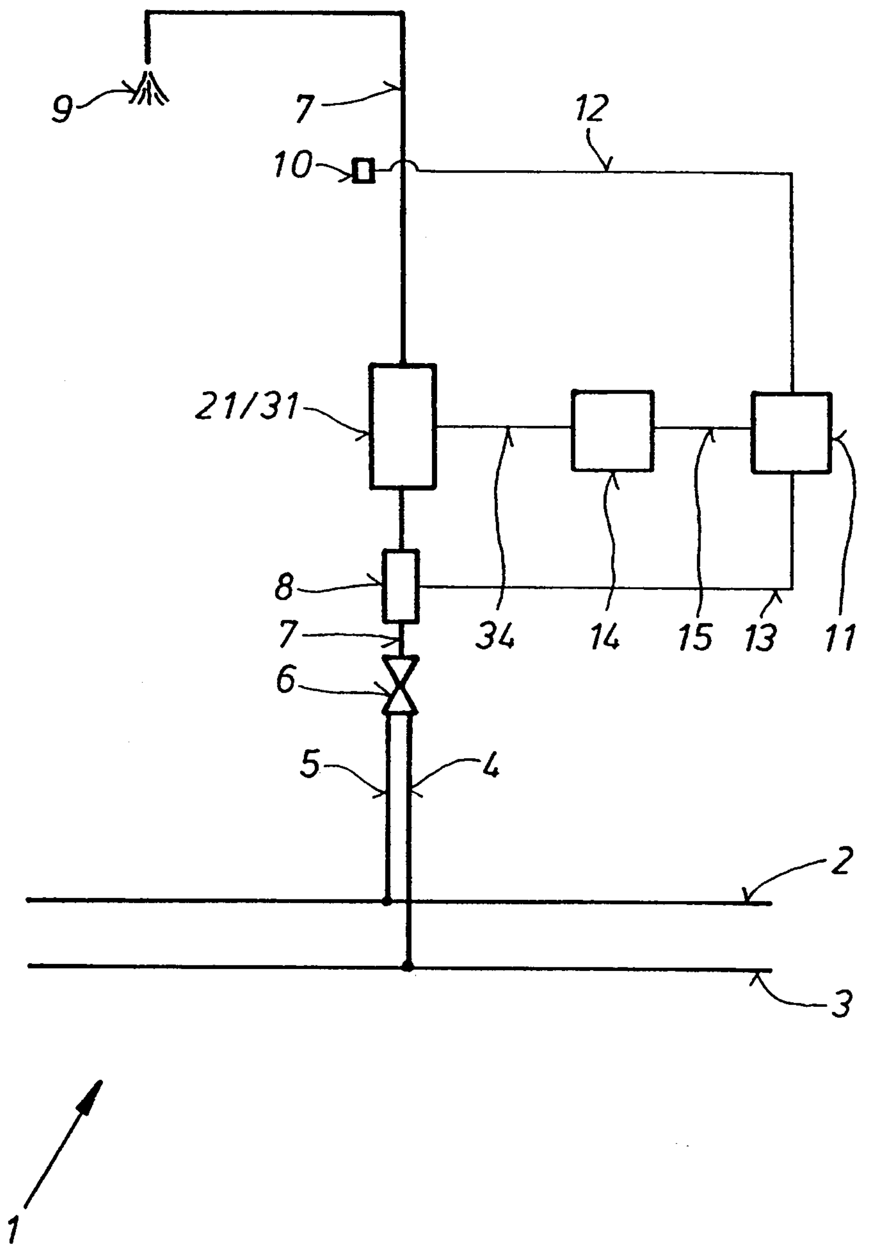
FIG. 1 a schematic view of the plumbing fixture.

The plumbing fixture 1 illustrated in FIG. 1 is provided with a mixer valve 6 as well as a check or non-return valve 8 that is disposed downstream of the mixer valve and that is controlled by a sensor 10. Water supplied from a cold water line 2 and a warm water line 3 to the mixer valve 6 via branch lines 4 and 5 is mixed in the mixer valve in conformity with the adjusted water distribution and can then flow out of a water outlet 9, to which the mixed water is supplied via a water line 7, as soon as the check or shut-off valve 8 is opened by a pulse emitted from the sensor 10.

A control unit 11 is provided to excite the armature coil of the shut-off valve 8 as a function of the pulses of the sensor 10; the control unit is connected via a signal line 12 to the sensor 10 and via a further signal line 13 to the check-valve 8. In addition, an energy accumulator 14 in the form of a chargeable accumulator or a capacitor is connected to the control unit 11 to supply the same with electrical energy and to supply power to the armature coil of the shut-off valve 8 via a line 15. However, it is also possible to operate the unit without the energy accumulator 14.

The control unit 11 is used to control the flow of water to the water outlet 9, to which a mixture of cold and warm water in conformity with the setting of the mixer valve 6 is directed as soon as the sensor 10 activates the control unit 11.

In order to charge the energy accumulator 14 independently of a main power source, a generator 31 is connected to the energy accumulator 14 via a power line 34. The generator 31 is operatively connected with a turbine 21 that can be rotatably driven, by the water that is flowing in the water line 7, about a shaft A that extends in the direction of flow.

Figure 2:
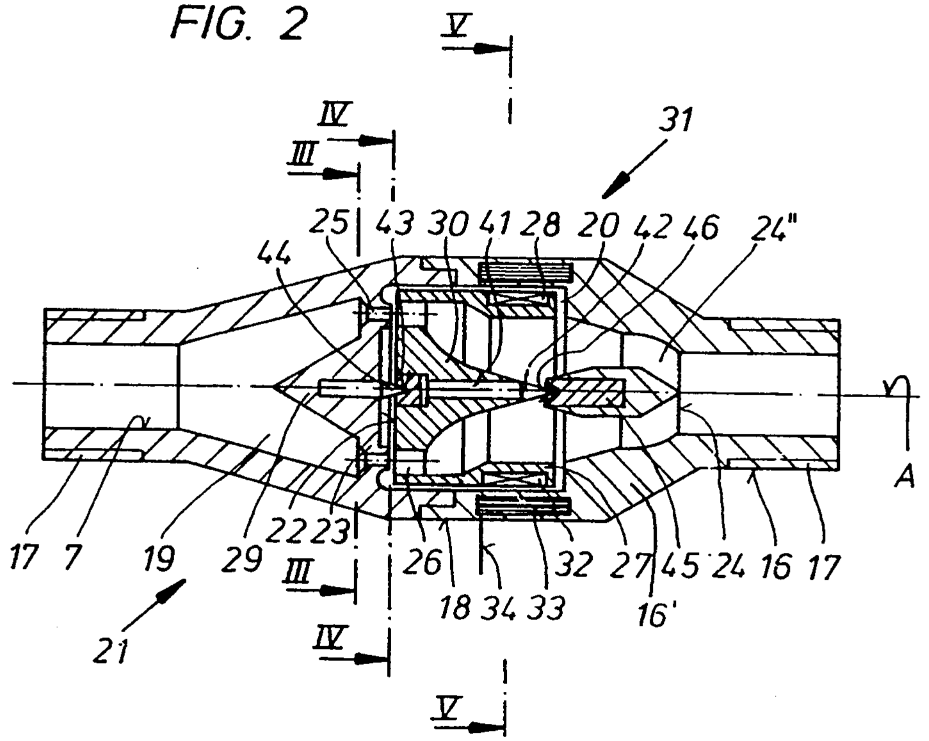
FIG. 2 a longitudinal cross-sectional view of the water line equipped with a turbine and a generator, FIGS. 3 to 5 cross-sectional views taken along the lines III—III, IV—IV and V—V in FIG. 2, and FIG. 3*a* the angular disposition of the jet apertures FIG. 4*a* the angular disposition of the vanes FIG. 6 in a view similar to that of FIG. 2, another embodiment of the turbine and of the generator.
Figure 3:
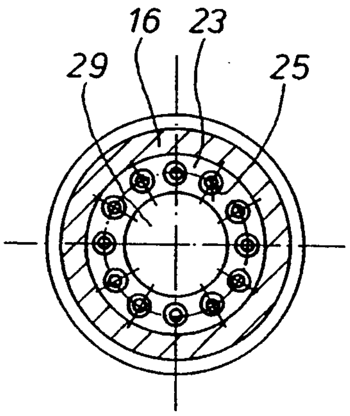
Figure 4:
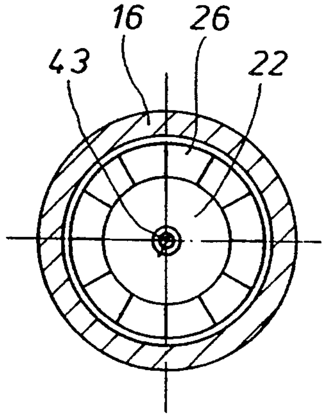
Figure 5:
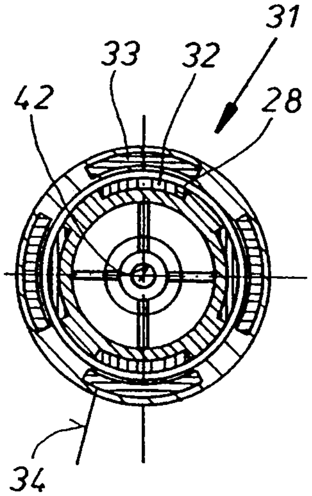
Figure 3A:
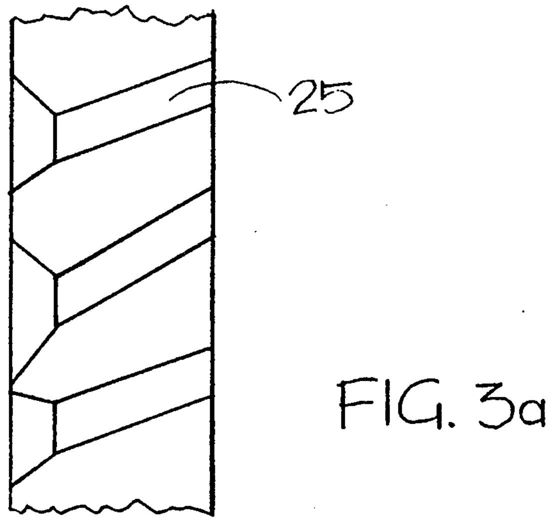
Figure 4A:
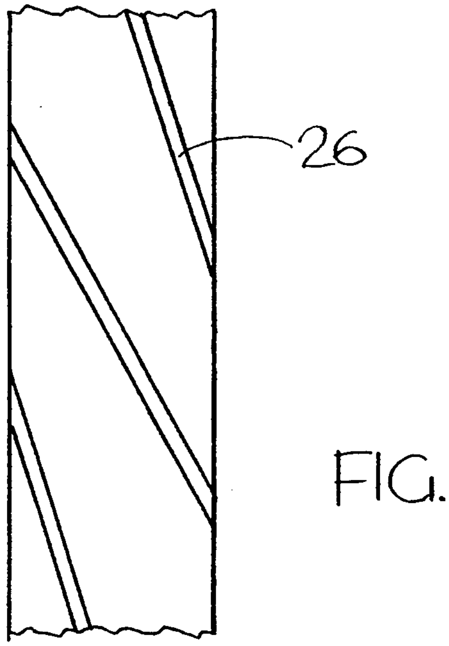

As can be seen in particular from FIG. 2, the turbine 21 and the generator 31 are disposed in a tubular section 16 that is embodied as a connector and is provided with a conical widened portion 18; the tubular section is easy to insert into a line by means of threads 17. In order to be able to rotatably mount the rotor or wheel 22 of the turbine 21, the tubular section 16 is provided with a first partition 23 and a second partition 24, between which the wheel 22 is mounted on points. For this purpose, an insert 41 is disposed in the wheel 22; one side of the insert is provided with a centering point 42 while the other side of the insert is provided with a centering bore 43 into which extends a centering point 44 of the first partition 23. The centering point 42 of the insert 41 extends into a centering bore 46 of an insert 45 that is disposed in the second partition 24, which is provided with flow channels 24″ to enable water to flow through with ease.

Furthermore, several nozzle or jet apertures 25 are provided in the outer diameter region of the first partition 23, and the wheel 22 of the turbine 21 is provided with vanes 26 that are mounted relative to the apertures such that they are driven by water that emerges at high speed from the jet apertures 25, in turn causing the wheel 22 of the turbine 21 to rotate at high speed. Expediently, the jet apertures 25 are disposed at an angle relative to the direction of flow of the water, and the vanes 26 extend perpendicular to the axes of the jet apertures 25. In addition, the number of vanes 26 of the turbine wheel 22 expediently correspond to the number of jet apertures 25 in the first partition 23.

Permanent magnets 32 are disposed in axially oriented recesses 28 of an axially projecting extension 27 of the wheel 22, which extension extends into a recess 20 of the tubular section 16; the permanent magnets cooperate with magnet coils 33 that are disposed in the wall 16′ of the tubular section 16 and that are connected to the energy accumulator 14 by means of the power line 34, so that when the wheel 22 of the turbine 21 rotates, electrical power is induced in the coils 33. The energy derived from the water that flows in the water line 7 is thus transferred to the energy accumulator 14 without significant losses.

The side of the first partition 23 that faces the oncoming flow of water is provided with a projection 29 that is favorably shaped for hydrodynamic operation and forms an annular channel 19 via which the water is directed to the jet apertures 25. Furthermore, since the wheel 22 of the turbine 21 has a projection 30 that projects in a direction towards the second partition 24, it is possible to ensure that hydrodynamic losses in the region of the turbine 21 and the generator 31 are kept to a low level.

Figure 6:
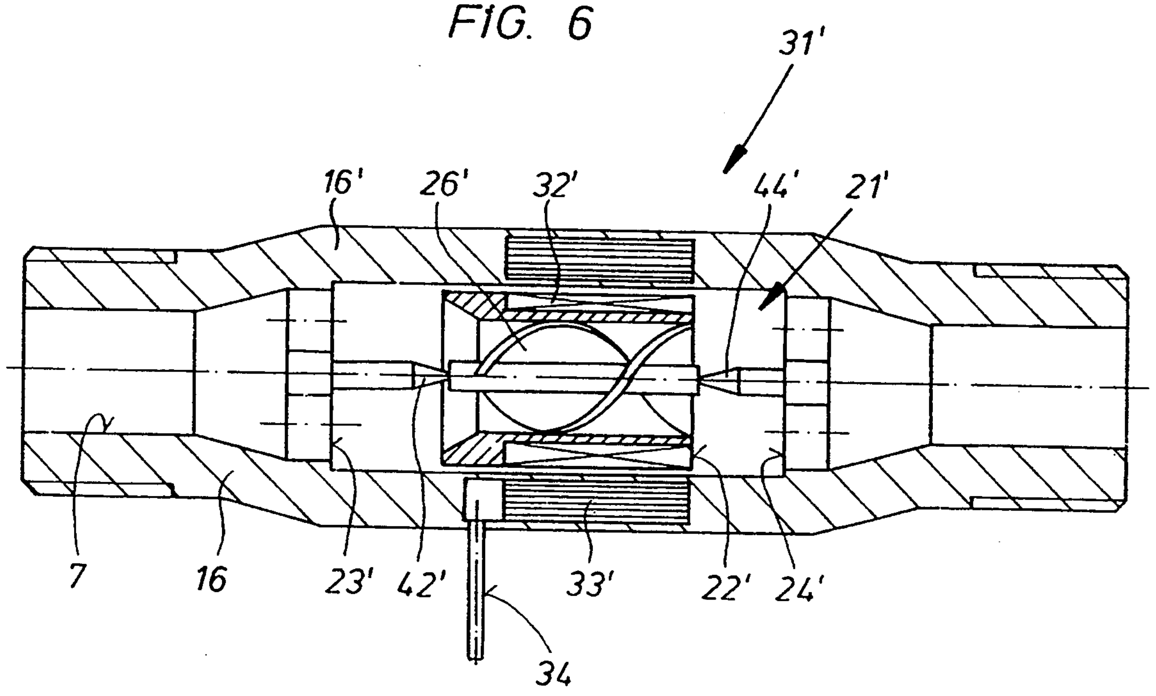

In the embodiment illustrated in FIG. 6, the turbine 21′ is disposed radially inwardly of the generator 31′. For this purpose, the wheel 22′ of the turbine 21′ is provided with vanes 26′ and is rotatably mounted between two centering points 42′ and 44′ of the partitions 23′ and 24′; the outer periphery of the wheel carries the permanent magnets 32′ of the generator 31′, whereby when the wheel 22′ rotates, the permanent magnets cooperate with the magnet coils 33′ that are disposed in the wall 16′ of the tubular section 16, thereby again inducing electrical power in the coils that is conveyed to the energy accumulator 14 via the power line 34 or directly to the control unit 11.

The present invention is, of course, in no way restricted to the specific disclosure of the specification and drawings, but also encompasses any modifications within the scope of the appended claims.

What I claim is:

1. A plumbing fixture that can be actuated without physical contact, comprising:

- a water line that is connected to a source of water and has a water outlet;
- a mixer valve disposed in said water line;
- a shut-off valve disposed in said water line downstream of said mixer valve;
- a proximity-sensitive sensor;
- a control unit for controlling said shut-off valve as a function of control signals from said sensor;
- a turbine disposed in said water line for supplying electrical energy to said control unit, said turbine having a wheel that is rotatably drivingly mounted on a shaft that extends in a direction of flow in a water supply channel of a tubular section of said water line, wherein said tubular section is provided with a first partition through which water can flow and a second partition through which water can flow, with said turbine wheel being disposed between said first and said second partitions, said first partition being disposed upstream of said turbine wheel and being provided in an outer region thereof with at least one jet aperture, which is disposed at an angle relative to said direction of flow; and a generator that is operatively associated with said turbine, whereby permanent magnets are distributed equidistantly about an outer periphery of said turbine wheel, and a wall of said tubular section is provided, at a level of said permanent magnets, with at least two magnet coils that are oriented in an axial direction of said tubular section and cooperate with said permanent magnets to form said generator.

2. A plumbing fixture according to claim 1, wherein said generator is connected to an energy accumulator.

3. A plumbing fixture according to claim 2, wherein said energy accumulator is a capacitor.

4. A plumbing fixture according to claim 1, wherein said turbine wheel is rotatably supported in said first and second partitions by means of appropriate centering points and centering bores.

5. A plumbing fixture according to claim 1, wherein at a level of said at least one jet aperture, said turbine wheel is provided with vanes.

6. A plumbing fixture according to claim 5, wherein said vanes extend perpendicular to an axis of said at least one jet aperture.

7. A plumbing fixture according to claim 5, wherein the number of vanes of said turbine wheel corresponds to the number of jet apertures in said first partition.

8. A plumbing fixture according to claim 1, wherein said turbine wheel is provided with an axially projecting extension that extends into a recess of said tubular section of said water line, and wherein said permanent magnets are disposed in said extension.

9. A plumbing fixture according to claim 8, wherein said generator is a synchronous generator.

10. A plumbing fixture according to claim 1, wherein said turbine wheel, radially inwardly of said permanent magnets, is provided with vanes that are adapted to be driven by flowing medium.

11. A plumbing fixture according to claim 1, wherein at least one of a side of said turbine wheel facing away from said first partition, and outer sides of said first and second partitions, are provided with conical projections that are shaped in a way that enhances flow.

12. A plumbing fixture according to claim 1, wherein said tubular section includes a conical widened portion in which are disposed said first and second partitions and said turbine wheel that is disposed therebetween.

13. A plumbing fixture that can be actuated without physical contact, comprising:

a water line that is connected to a source of water and has a water outlet;

a mixer valve disposed in said water line;

a shut-off valve disposed in said water line downstream of said mixer valve;

a proximity-sensitive sensor;

a control unit for controlling said shut-off valve as a function of control signals from said sensor;

a turbine disposed in said water line for supplying electrical energy to said control unit, said turbine having a wheel that is rotatably drivingly mounted on a shaft that extends in a direction of flow in a water supply channel of a tubular section of said water line, wherein said tubular section is provided with a first partition through which water can flow and a second partition through which water can flow, with said turbine wheel being disposed between said first and said second partitions, said first partition being disposed upstream of said turbine wheel and being provided in an outer region thereof with at least one jet aperture, wherein at a level of said at least one jet aperture, said turbine wheel is provided with vanes that extend perpendicular to an axis of said at least one jet aperture; and a generator that is operatively associated with said turbine, whereby permanent magnets are distributed equidistantly about an outer periphery of said turbine wheel, and a wall of said tubular section is provided, at a level of said permanent magnets, with at least two magnet coils that are oriented in an axial direction of said tubular section and cooperate with said permanent magnets to form said generator.

14. A plumbing fixture according to claim 13, wherein said at least one jet aperture is disposed at an angle relative to said direction of flow.

15. A plumbing fixture that can be actuated without physical contact, comprising:

a water line that is connected to a source of water and has a water outlet;

a mixer valve disposed in said water line;

a shut-off valve disposed in said water line downstream of said mixer valve;

a proximity-sensitive sensor;

a control unit for controlling said shut-off valve as a function of control signals from said sensor;

a turbine disposed in said water line for supplying electrical energy to said control unit, said turbine having a wheel that is rotatably drivingly mounted on a shaft that extends in a direction of flow in a water supply channel of a tubular section of said water line, wherein said tubular section is provided with a first partition through which water can flow and a second partition through which water can flow, with said turbine wheel being disposed between said first and said second partitions, said first partition being disposed upstream of said turbine wheel and being provided in an outer region thereof with at least one jet aperture, wherein at a level of said at least one jet aperture, said turbine wheel is provided with vanes, and wherein the number of vanes of said turbine wheel corresponds to the number of jet apertures in said first partition; and a generator that is operatively associated with said turbine, whereby permanent magnets are distributed equidistantly about an outer periphery of said turbine wheel, and a wall of said tubular section is provided, at a level of said permanent magnets, with at least two magnet coils that are oriented in an axial direction of said tubular section and cooperate with said permanent magnets to form said generator.

* * * * *

UNITED STATES PATENT AND TRADEMARK OFFICE
CERTIFICATE OF CORRECTION

PATENT NO. : 5,349,985

DATED : Sep. 27, 1994

INVENTOR(S) : Fischer

It is certified that error appears in the above-identified patent and that said Letters Patent is hereby corrected as shown below:

On the title page: items

[22] PCT Filed: 14 July 1992

[86] PCT No.: PCT/DE92/00587

§ 371 Date: Mar. 12, 1993

§ 102(e) Date: Mar. 12, 1993

[87] PCT Pub. No.: WO 93/02258

PCT Pub. Date: 4 February 1993

Signed and Sealed this

Thirteenth Day of December, 1994

*Attest:*

BRUCE LEHMAN

*Attesting Officer*

*Commissioner of Patents and Trademarks*